May 28, 1957 J. E. OSTLINE 2,794,070

TAPE PERFORATING MACHINES FOR TOLL TICKETING TELEPHONE SYSTEMS

Filed Jan. 22, 1951 3 Sheets-Sheet 1

INVENTOR.

John E. Ostline

BY

Smith, Olsen & Baird

Attys.

INVENTOR.
John E. Ostline
BY
Smith, Olsen + Baird
Attys.

May 28, 1957

J. E. OSTLINE

TAPE PERFORATING MACHINES FOR TOLL TICKETING TELEPHONE SYSTEMS 2,794,070

Filed Jan. 22, 1951

3 Sheets-Sheet 3

INVENTOR.
John E. Ostline

BY

Smith, Olsen & Baird

Attys.

United States Patent Office 2,794,070
Patented May 28, 1957

2,794,070

TAPE PERFORATING MACHINES FOR TOLL TICKETING TELEPHONE SYSTEMS

John E. Ostline, Chicago, Ill., assignor to General Telephone Laboratories, Incorporated, a corporation of Delaware Application January 22, 1951, Serial No. 207,092

16 Claims. (Cl. 179—7.1)

Figure 1:
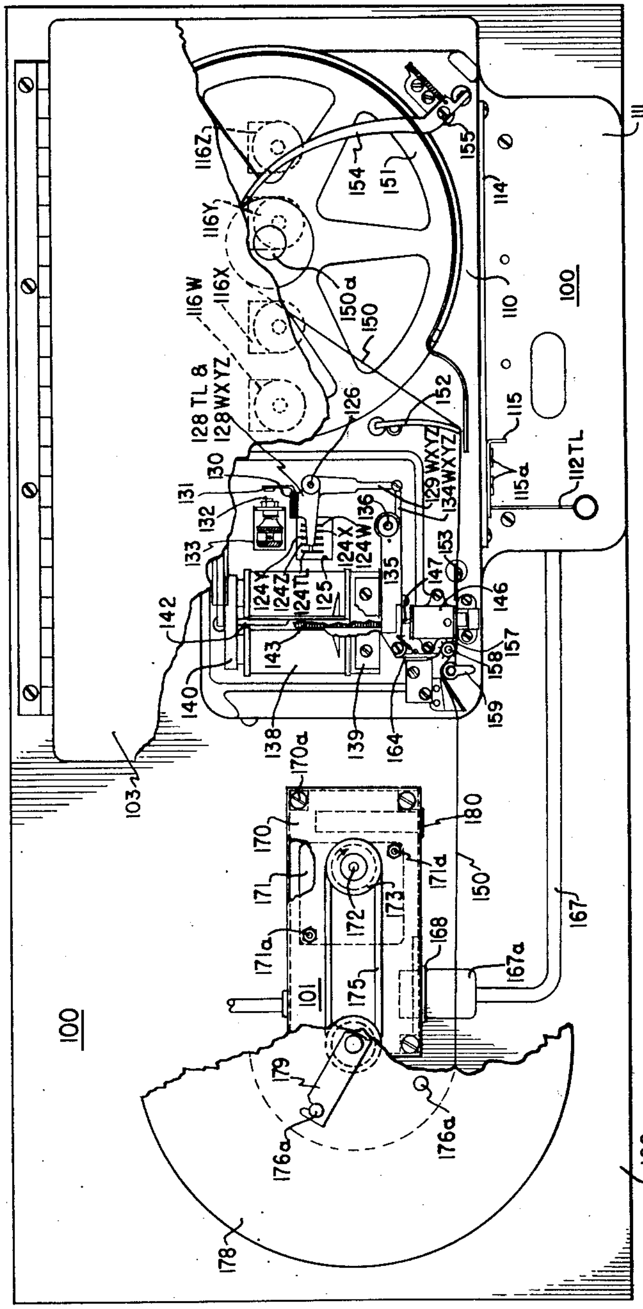

The present invention relates to tape perforator machines for use in toll ticketing telephone systems of the type disclosed in the copending Ostline application Serial No. 75,985, filed February 12, 1949, now Patent No. 2,678,353, granted May 11, 1954, and more particularly to tape perforator machines which are adapted to be selectively controllable by the apparatus included in such telephone systems to produce perforated tape records of the various items of record information pertaining to each completed telephone call.

It is the object of the present invention to provide in a toll ticketing telephone system of the type noted a tape perforating mechanism provided with electromagnetic means which is selectively controllable to cause the perforating mechanism to perforate a tape in accordance with variable items of information pertaining to the telephone connection which have been stored in the telephone apparatus.

It is a further object of the invention to provide in a tape perforator of the type noted improved electromechanical apparatus which is adapted continuously to test the supply of tape on a supply reel in order to transmit an alarm signal and to mark an associated tabulator busy whenever the supply of tape on the supply reel becomes inadequate.

It is still another object of the invention to provide in a tape perforator of the type noted improved electromechanical apparatus which is adapted continuously to test the tension on the tape between the supply reel and a punch mechanism in order to transmit an alarm signal and to mark the associated tabulator busy whenever a break occurs in the tape.

It is still another object of the invention to provide in a tape perforator of the type noted an improved motor driven take-up reel mechanism which is adapted to wind the tape after it has been perforated by the perforating mechanism.

It is still another object of the invention to provide in a tape perforator of the type noted an electromechanical control mechanism for starting the motor for the take-up reel each time the perforating mechanism is taken into use, and for stopping the said motor each time the perforating mechanism is released.

It is still another object of the invention to provide in a tape perforator of the type noted an improved slip-clutch arrangement for the motor driven take-up reel which is arranged so that the reel will be restrained from rotation by the motor whenever the tape is held against movement by the tape feeding arrangement in the perforating mechanism.

It is still another object of the invention to provide in a toll ticketing telephone system a pair of tape perforating mechanisms which are adapted to be controlled simultaneously by storage apparatus in an associated tabulator to produce a perforated tape record of certain variable items of record information pertaining to each telephone connection and which are also adapted to be selectively controlled individually by the associated tabulator to produce a perforated tape record of certain other variable items of record information. With this arrangement one of the tape perforators may be selectively controlled to produce a perforated tape record of the items of information which are pertinent in conjunction with establishing an appropriate charge for a telephone connection against the calling subscriber substation and the other of the tape perforators may be selectively controlled to produce a perforated tape record of all of the items of record information which are produced by the said one tape perforator, and in addition thereto is also selectively controlled to produce a record of the items of information pertaining to the identity of the particular exchange apparatus which is utilized in establishing the telephone connection.

Further objects and features of the invention pertain to the particular arrangement of the various mechanical elements of the tape perforator and the particular arrangement of the various circuit elements of the telephone system for controlling the tape perforators whereby the above outlined and additional operating features are attained.

Figure 2:
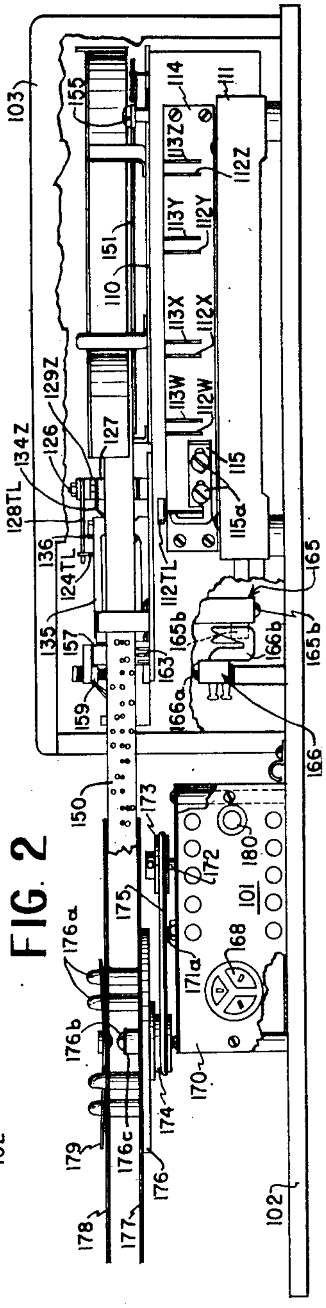
Figures 3, 5:
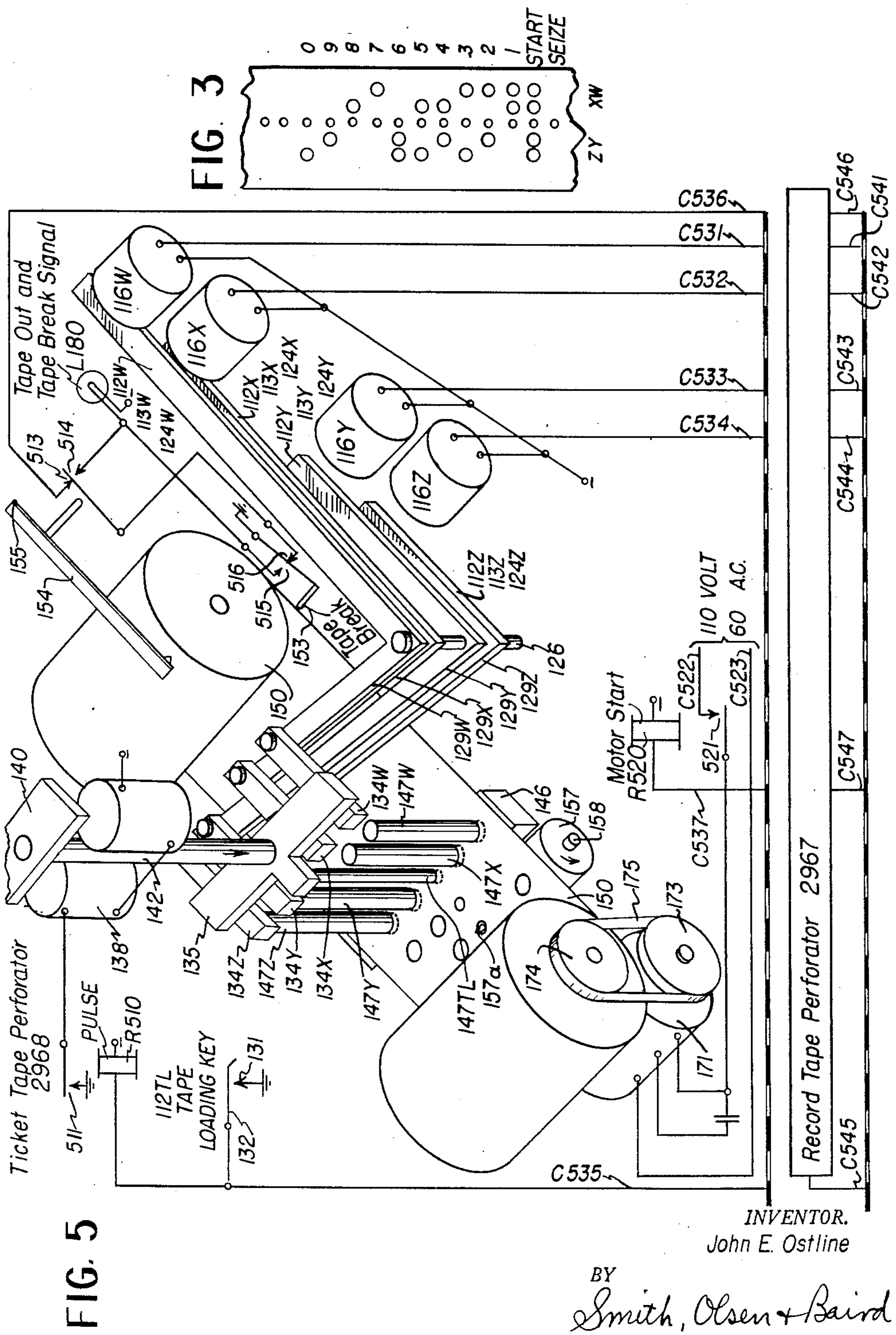

The invention, both as to its organization and method of operation, together with further objects and advantages thereof will best be understood by reference to the following specification taken in connection with the accompanying drawings in which Figure 1 is a plan view, partly broken away, of a tape perforating mechanism constructed and arranged in accordance with the present invention; Fig. 2 is a front view, partly broken away, of the mechanism; Fig. 3 is a view of a small section of a tape which has been punched by the perforating mechanism; and Figs. 4 and 5, taken together, show a circuit diagram of a toll ticketing telephone system employing the improved tape perforating mechanism, illustrating certain of the circuit details for controlling the tape perforator, and schematically illustrating certain of the operating and mechanical features of the tape perforator.

Referring now more particularly to Figs. 1 and 2 of the drawings, there is illustrated therein a tape perforating mechanism 100, a tape take-up mechanism 101, a main base plate 102 for supporting the perforating and take-up mechanisms, and a cover 103 for the tape perforating mechanism 100. The illustrated embodiment of the tape perforating mechanism 100 is of substantially the same general construction and arrangement as the manually operable key controlled tape perforating mechanism disclosed in the Charles L. Krum et al. Patent No. 1,182,179, granted May 9, 1916.

The various elements of the tape perforating mechanism 100 are mounted on a metal base 110 having a depressed front portion 111. Above the depressed front portion 111, the base 110 is provided with an opening through which the forward end of a tape loading key lever 112TL extends. Four additional key levers 112W, 112X, 112Y and 112Z are also provided in the present tape perforating mechanism, but instead of being manually operable, as is the tape loading key lever 112TL, they are selectively operable by means of individual electromagnets 116W, 116X, 116Y and 116Z which are mounted on the underside of the base 110. Consequently, the key levers 112W to 112Z, inclusive, have been cut off at their front ends so that they do not extend over the depressed front portion 111. In order to permit selective control of each of the key levers 112W to 112Z, inclusive, the corresponding electromagnets 116W to 116Z, inclusive, are provided with magnet levers 113W to 113Z, inclusive, which are arranged so that they will actuate the associated key levers when the corresponding electromagnet is energized. The key levers and the magnet levers noted above are mounted at their rear ends upon a fulcrum rod that is suitably supported on the underside of the base 110 and the forward ends of the levers extend through slots formed in a guide strip 114 which is secured to the depressed front portion of the base 110. With this arrangement each electromagnet, upon energization, causes the associated magnet lever to pull down the associated key lever thereby to actuate the key lever in substantially the same manner as occurs when a key lever of the Krum et al. patent is manually depressed.

In order to prevent inadvertent actuation of the manually operable tape loading key lever 112TL, a key retainer 115 is slidably secured to the base 110 by means of the screws 115*a*. In the position illustrated in the drawings, the key retainer 115 is moved to its left-hand position in order to permit manual actuation of the key lever 112TL. However, if the key retainer 115 is moved to its right-hand position by the exchange attendant it locks the tape loading key 112TL in its unoperated position and thereby prevents manual actuation thereof.

Each of the above noted key levers is arranged so that it cooperates with a U-shaped member (not shown) which is pivotally supported on the underside of the base 110. One end of each of the U-shaped members is formed with a vertical arm which projects upwardly through an opening 125 in the base 110. The U-shaped members are constructed and arranged so that energization of any one of the magnets 116W to 116Z, inclusive, causes the corresponding magnet lever 113W to 113Z, inclusive, to control the corresponding key lever 112W to 112Z, inclusive, and the latter key levers, in turn, control the corresponding U-shaped members to move the associated vertical arms 124W to 124Z, inclusive, a short distance in a forward direction toward the front of the tape perforating mechanism. Furthermore, when the tape loading key 112TL is manually depressed, it is arranged to mechanically move all of the U-shaped members that cooperate with the magnets 116W to 116Z, inclusive, in order to simulate energization of all of the associated magnets. In addition thereto, the tape loading key 112TL controls its U-shaped member in order to move the corresponding vertical arm 124TL toward the front of the tape perforating mechanism. In this manner, the tape loading key 112TL, upon manual actuation, moves all of the vertical arms 124TL and 124W to 124Z, inclusive, a short distance toward the front of the machine as seen in Fig. 1.

The vertical arms noted above are arranged so that they cooperate with a series of bell crank levers which are pivotally mounted upon a stud 126 secured to the base 110 adjacent the right-hand edge of the opening 125. In order to provide adequate spacing between the bell crank levers, they are spaced apart from one another on the stud 126 by means of the washers 127. In considering the bell crank levers it should be noted that the top or uppermost bell crank lever on the stud 126, comprises a laterally extending arm 128TL, and a rearwardly extending lug 130 which carries an insulated contact spring 131. This contact spring is arranged to cooperate with an insulated contact screw 132 which is adjustably mounted upon a bracket 133 projecting upwardly from the base 110. The laterally extending arm 128TL is of sufficient length to cooperate with the left-hand vertical arm 124TL which is also the highest arm extending through the opening 125. With this arrangement, the forward movement of the vertical arm 124TL, in response to actuation of the tape loading key 112TL, controls the left-hand end of the laterally extending arm 128TL to cause it to rotate slightly in a counterclockwise direction about the stud 126, whereby the contact spring 131 is moved into engagement with the contact screw 132. The engagement of the contacts 131 and 132 completes an electrical circuit for controlling the punch magnet 138 in the manner to be described hereinafter.

The remaining four bell crank levers respectively comprise a laterally extending arm 128W, 128X, 128Y or 128Z and a forwardly extending arm 129W, 129X, 129Y or 129Z. Each of the laterally extending arms 128W to 128Z, inclusive, is formed so that it extends from the stud 126 a sufficient distance to cooperate with only the corresponding vertical arms 124W to 124Z, inclusive, and each of the last-mentioned arms extend upwardly through the opening 125 sufficiently to cooperate only with its corresponding laterally extending arm. It should be understood from the foregoing, that when one or more of the magnets 116W to 116Z, inclusive, are energized, the corresponding vertical arms 124W to 124Z, inclusive, are moved slightly in a forward direction in order to rotate the corresponding bell crank levers in a counterclockwise direction about the stud 126 and to cause the associated forwardly extending arms 129W to 129Z, inclusive, to move a slight distance to the right in a counterclockwise direction.

The forwardly extending arms 129W to 129Z, inclusive, are respectively provided with punch controlling bars 134W to 134Z, inclusive, which are pivotally mounted at the forward ends of the associated arms. These bars extend laterally from the forward ends of the associated arms 129W to 129Z, inclusive, through a series of guide grooves (not shown) which are formed in the front surface of a punch hammer 135. The punch hammer 135, at its right-hand end, is pivotally mounted upon a vertical pivot stud 136 secured to the base 110. It should be noted that the punch controlling bars 134W to 134Z, inclusive, are slidably arranged in the punch hammer 135 so that they may be moved with the punch hammer 135 as it pivots about the stud 136 and so that they may be moved longitudinally, independently of the punch hammer 135, under control of the bell crank arms 129W to 129Z, inclusive.

A double coil punch magnet 138 is mounted on a bracket 139 secured to the base 110 for the purpose of actuating the punch hammer 135. In the present arrangement, a magnet armature 140 is provided at the rear end of the punch magnet 138 and a plunger rod 142, secured thereto, extends forwardly a sufficient distance to engage the rear surface of the punch hammer 135. A spring 143 is connected to the punch hammer 135 in order to hold the punch hammer in its normally retracted position, as is shown in Fig. 1. Whenever the coils of the punch magnet 138 are energized, the magnet armature 140 is attracted in a conventional manner in order to move the plunger rod 142 in a forward direction against the rear surface of the punch hammer 135 in order to perforate the tape 150 in the manner to be described hereinafter.

A punch block 146, mounted on the base 110 in front of the punch hammer 135, carries four horizontal punches 147W to 147Z, inclusive, arranged in vertical alignment with the four punch controlling bars 134W to 134Z, inclusive. A fifth punch 147TL, which is somewhat smaller in diameter, is positioned in the center of the vertical alignment of the four above noted punches and is designed to perforate a small feed hole in the center of the tape 150, as is clearly illustrated in Fig. 3. The rear end of the centrally positioned feed punch 147TL is somewhat longer than the remaining four punches 147W to 147Z, inclusive, so that it will be actuated by the punch hammer 135 to perforate a feed hole in the tape 150 each time the punch magnet 138 is energized. The remaining four punches 147W to 147Z, inclusive, are respectively arranged in horizontal alignment with the punch controlling bars 134W to 134Z, inclusive, so that they may be selectively actuated by the corresponding magnets 116W to 116Z, inclusive. In the normal position shown in Figs. 1 and 2 of the drawings, i. e., with the magnets 116W to 116Z, inclusive, in their deenergized positions, the left-hand ends of the punch controlling bars 134W to 134Z, inclusive, are interposed between the rear ends of the punches 147W to 147Z, inclusive, and the front surface of the punch hammer 135, so that they will be driven forward by the punch hammer 135 to perforate the tape 150 each time the punch magnet 138 is energized. When one or more of the magnets 116W to 116Z, inclusive, is energized the corresponding punch controlling bars 134W to 134Z, inclusive, are moved to the right sufficiently to withdraw the left-hand end of the corresponding punch controlling bars from between the rear ends of the associated punches 147W to 147Z, inclusive, and the front surface of the punch hammer 135. Consequently, the punches corresponding to the withdrawn punch controlling bars will not be driven forward to perforate the tape 150 when the punch hammer 135 is actuated.

As previously noted, each time the tape loading key lever 112TL is manually actuated, the punch controlling bars 134W to 134Z, inclusive, are mechanically withdrawn from the rear ends of the punches 147W to 147Z, inclusive, in order to simulate the action that occurs when each of the magnets 116W to 116Z, inclusive, is energized. Also, the contacts 131 and 132 are closed in order to complete the energizing circuit for the punch magnet 138. In response to the energization of the punch magnet 138, the punch hammer 135 will actuate only the punch 147TL to perforate the small tape feed hole in the central portion of the tape 150. The remaining four punches will not be actuated to perforate the tape 150, since the associated punch control bars 134W to 134Z are withdrawn. When any one or more of the magnets 116W to 116Z, inclusive, are deenergized and thus restored to normal, and any one or more of the magnets 116W to 116Z, inclusive, are operated or in their energized positions, the punch magnet 138 may be energized, over a separate circuit to be described hereinafter which is independent of the above mentioned circuit including the contacts 131 and 132, in order to cause the punch hammer 135 to actuate the center feed hole punch 147TL and also the punches 147W to 147Z inclusive corresponding to only the restored or deenergized magnets 116W to 116Z, inclusive. In this manner, transverse rows of perforations including the small center feed hole and one or more larger holes, will be punched in the tape 150 to represent, in code form, different characters.

Consequently, each time the punch magnet 138 is energized, an additional character and a feed hole will be punched in the tape 150 at spaced intervals with the feed holes being formed to be engaged by a suitable tape feed roll. A tape feed roll 157, shown to the left of the punch block 146, which is rotatably carried by a shaft 158 supported on the base 110. Spaced at equal intervals around the tape feed roll 157, a series of projecting feed pins 157a are provided which are adapted to mesh with the small feed holes punched in the central portion of the tape 150. A tape tension lever 159 is also provided which is spring biased to hold the tape 150 against the feed roll 157 in order to retain the feed holes in the tape in constant mesh with the projecting feed pins. A plurality of ratchet teeth 163 are provided at the lower end of the tape feed roll 157, which are arranged to cooperate with a tape feed pawl mechanism 164. This pawl is pivotally carried on an extension of the punch hammer 135 and is arranged so that it will pass over one of the teeth 163 during the forward movement of the punch hammer 135 in order to engage the next succeeding one of the ratchet teeth 163. When the punch hammer 135 restores to its normal position, the tape feed roll 157 will be rotated in a clockwise direction under control of the pawl 164 in order to advance the tape 150 one character space. Accordingly, each actuation of the punch hammer 135 prepares the tape feed roll 157 for rotation and each restoration of the hammer 135 rotates the tape feed roll 157 one character space in order to position a blank portion of the tape 150 in front of the aligned punches 147.

A roll of unpunched tape 150, having an arbor 150a is carried by a tape reel 151 which is rotatably supported in a suitable manner upon the base 110. As is shown in Fig. 1, the tape 150 is unwound from the reel 151 in a counterclockwise direction and is passed over the end of a spring tensioned arm 152 and then through appropriate tape guide openings in the punch block 146. The tape 150 thereafter passes over a portion of the periphery of the tape feed roll 157 with the small feed holes, which have been punched in the tape, in mesh with the previously noted tape feed roll pins 157a. At this point it should be noted that the pins 157a in the tape feed roll 157 restrain the tape 150 from movement in a forward and a backward direction, and that the spring tensioned arm 152, which is biased to rotate in a counterclockwise direction, maintains the tape 150 under a predetermined tension which is insufficient to tear the tape feed holes at the place where they are in engagement with the tape feed pins. Immediately to the right of the punch block 146 a tape-break lever 153 is provided which is retained in a first or operated position under control of the tension maintained on the tape 150 and which is restored to a second or unoperated position whenever the tape 150 breaks or is torn at any point between the tape feed pins 157a and the tape reel 151. In the first, or operated position, the tape-break lever 153 retains a first pair of contacts in their closed positions and a second pair of contacts in their open positions. In the second position of the tape-break lever 153, the first pair of contacts are open and the second pair of contacts are closed. The circuits involving the above mentioned contacts which are controllable by the tape-break lever 153, will be described hereinafter.

In addition to the tape-break lever 153 described above, the tape perforating mechanism 100 is also provided with a tape supply testing arm 154 which is pivotally mounted at one end on the stud 155 secured to the base 110 and which is spring tensioned in a counterclockwise direction so that the opposite end of the arm 154 remains in engagement with the peripheral surface of the roll of tape 150. The arm 154 is arranged so that it will open a first pair of normally closed contacts and so that it will close a second pair of normally open contacts when the supply of tape 150 on the reel 151 is almost exhausted. The circuits involving the above noted contacts, which are controlled by the tape supply testing arm 154, will be described hereinafter.

In order to provide an arrangement for readily removing the tape perforating mechanism 100 from the main base plate 102 without unsoldering a plurality of electrical connections extending between the tape perforator 100 and a tabulator mechanism, such as the tabulator 2800 (Fig. 4), a plug member 165 is secured to the underside of the tape perforator base 110 and a cooperating jack member 166 is secured to the upper surface of the main base plate 102. Referring now to Fig. 2, it will be seen that the plug member 165 is secured to the undersurface of the base 110 by means of a plurality of screws 165a. Although only one of the plug contacts 165b is shown, it should be understood that a plurality of such contacts are mounted on the plug 165 in alignment with each other and spaced apart from one another by means of insulating material. It will also be seen that the jack member 166 is secured to the main base plate 102 by means of a plurality of screws 166a. Although only one of the jack contacts 166b is shown, it should also be understood that a plurality of such contacts are mounted in the jack 166 in alignment with each other and spaced apart from one another by means of insulating material. The jack contacts 166b are also arranged to cooperate with the corresponding plug contacts 165b in order to provide individual electrical contact means therebetween when the tape perforator 100 is mounted on the main base plate 102 with the plug and jack members in contact engagement with each other. However, when the tape perforator 100 is removed from the main base plate 102 the plug member 165 will be withdrawn from the jack member 166 thereby to sever the electrical connections including the contacts of these members.

In addition to the foregoing, the tape perforator 100 is provided with a three conductor cord 167 which terminates in a three-pronged polarized plug **167*a*. The plug 167*a* is arranged so that it may be plugged into a cooperating jack 168 mounted in the front wall of the housing of the tape take-up mechanism 101. The cord 167 is utilized to connect the tape perforating mechanism 100 to a commercial 110-volt 60 cycle alternating current and to a direct ground potential. The 110-volt currrent is employed to control the motor of the tape take-up mechanism 101**.

The tape take-up mechanism 101 shown at the left-hand end of the main base plate 102 in Figs. 1 and 2, includes a housing 170 which is secured to the main base plate 102 by means of a plurality of screws **170*a*. A motor 171 is secured to the underside of the top of the housing 170 by means of a plurality of bolts 171*a* with the drive shaft 172 of the motor extending upwardly through an opening in the top of the housing. A drive pulley 173 is rigidly secured to the upper end of the drive shaft 172 and a drive spring 175 is coupled between the drive pulley 173 and a take-up reel pulley 174. A flange 176 having an upwardly extending hub is securely riveted to the upper surface of the take-up reel pulley 174 and four upstanding studs 176*a* are securely fastened to the flange 176. These studs constitute the arbor around which the tape 150 is wound after it has been perforated by the perforating mechanism 100. The take-up reel assembly comprising the pulley 174, the flange 176 and the studs 176*a* are rotatably mounted on a bearing post (not shown) which is secured to the top of the housing 170. A screw 176*b* and a washer 176*c* are provided to retain the pulley assembly in place on the bearing post but they do not interfere with the free rotation of the pulley assembly under control of the drive pulley 173 and the coupling drive spring 175**.

A removable bottom reel plate 177 is provided with a central hole and four equally spaced holes which are of sufficient diameter to permit the plate 177 to rest upon the upper surface of the flange 176, with the studs **176*a* and the central hub portion of the flange 176 extending through the above noted holes in the plate 177. A removable upper reel plate 178 is also provided which is substantially identical to the bottom reel plate 177 except that it is arranged with a retaining clip 179 provided with slotted openings at its opposite ends thereof which cooperate with corresponding slots formed in the upper ends of each of the studs 176*a*. The retaining clip 179 is fastened to the center of the upper reel plate 178 in such a manner that it may be rotated independently of the plate 178 and thus permit the slotted end portions of the clip 179 to be engaged with or disengaged from the cooperating slots formed in the upper ends of the studs 176*a*. With this arrangement the forward end of the tape 150 may be wound around one of the studs 176*a* sufficiently to permit the tape 150 to overlap one or more of the layers which have been wound around the stud, thereby to hold the tape on the take-up reel assembly. Thereafter the upper reel plate 178 may be placed over the studs 176*a* and locked in place by means of the retaining clip 179. Consequently, when the motor 171 is in operation the pulley 173 and the spring drive 175** will tend to rotate the entire take-up reel assembly in a clockwise direction.

During the perforating operation of the tape perforating mechanism 100, the tape feed roll 157, by means of the pins **157*a* therein will pull the tape 150 from the supply reel 151 and feed it toward the take-up reel assembly. Since the motor 171 continues to rotate the take-up reel during the time that the tape perforating mechanism 100 is in use, the spring drive 175 attempts to rotate the take-up reel pulley 174 in order to wind the tape 150 on the arbor, comprising the studs 176*a*, on the take-up reel assembly. However, when the perforated tape which has been fed forward by the tape feed roll 157 has been wound on the take-up reel assembly, the tape 150 prevents the take-up assembly from further rotation by the motor 171, since the tape is now held by the tape feed roll 157. Although the motor 171 continues to rotate the motor pulley 173, the drive spring 175 being relatively loosely coupled around the motor pulley 173, permits the motor to continue its rotation without transferring the rotary motion to the take-up reel pulley 174 as long as the tape is restrained against movement by means of the tape feed roll 157. It will be apparent from the foregoing description that the spring drive 175 in cooperating with the motor pulley 173 and the take-up reel pulley 174 forms a slip-clutch arrangement whereby the slack in the tape 150** will be wound upon the take-up reel assembly but as soon as all of the slack has been taken up, the clutch arrangement will slip sufficiently to prevent tearing or breaking of the tape.

Finally, the take-up reel housing 170 is provided with a lamp jack 180 in the front wall thereof which contains a signal lamp for indicating the breaking of the tape 150 and also the inadequacy of the supply of tape upon the reel 151. The manner in which the signal lamp in the lamp jack 180 is illuminated to indicate the above noted conditions will be described hereinafter in connection with the description of the operation of the telephone system employing the tape perforating mechanism.

*Operation of the telephone system employing the tape perforating mechanism*

In considering the general operation of a toll ticketing telephone system employing the above described tape perforating mechanism, it should be noted that when a metropolitan toll call is extended from a subscriber substation in the FLorida 3 exchange (Fig. 4) to a called subscriber substation in the EMpire 1 exchange, the toll ticketing apparatus included in the originating FLorida 3 exchange will control a ticket tape perforating mechanism 2968 and a record tape perforating mechanism 2967 in order to produce perforated tapes containing respectively a record of various items of information pertaining to the toll call. The items of record information recorded on the tape perforated by the ticket tape perforating mechanism 2968 include the calling subscriber directory number, comprising three digits indicative of the calling exchange office code, and four digits indicative of the substation number of the calling subscriber. Also this tape includes the directory number of the called subscriber substation, the rate of charge applicable to the toll call, the time duration of the call, the class of the calling subscriber line, and the month, day, hour and minute that the call is released by the subscribers. In addition to the foregoing items of record information, the tape perforated by the record tape perforating mechanism 2967, includes a record of the identity of certain of the units of common apparatus, such as the identity of the director, the toll ticket repeater and the tabulator utilized in conjunction with the establishment of the connection between the calling and the called subscriber substations. At the end of a billing period, for example a month, the perforated tape produced by the ticket perforating mechanism 2968 may be removed from the take-up reel assembly, previously described, and then fed into a perforated tape controlled printing mechanism, or business machine, which is adapted to be controlled in accordance with the perforations in the tape to print individual tickets, or an itemized list, containing a record of each of the toll calls completed during the designated billing period. The printing mechanism may also be arranged automatically to calculate and print the cost of each completed toll call in accordance with the class, the rate, and the time duration of each toll call. Also, at the end of the designated billing period, the perforated tape produced by the record tape perforating mechanism 2967 may be fed through the printing mechanism in order to produce a tabulated printed record of the items of information of each of the toll calls, as noted above, and also the identification of each of the units of common equipment utilized in establishing each toll call. The latter printed record is of particular importance to the operating telephone company since it provides them with a permanent record of the common units of telephone apparatus utilized during the establishment of the toll calls.

A description will now be given of the operation of the circuits and apparatus provided in the FLorida 3 exchange for completing a telephone connection to a desired called station in the EMpire 1 exchange. Also, a description will be given of the operation of the tabulator 2800, whereby the ticket tape perforator 2968 and the record tape perforator 2967 are automatically controlled to produce a perforated tape record of the various items of information pertaining to the toll call.

Figure 4:
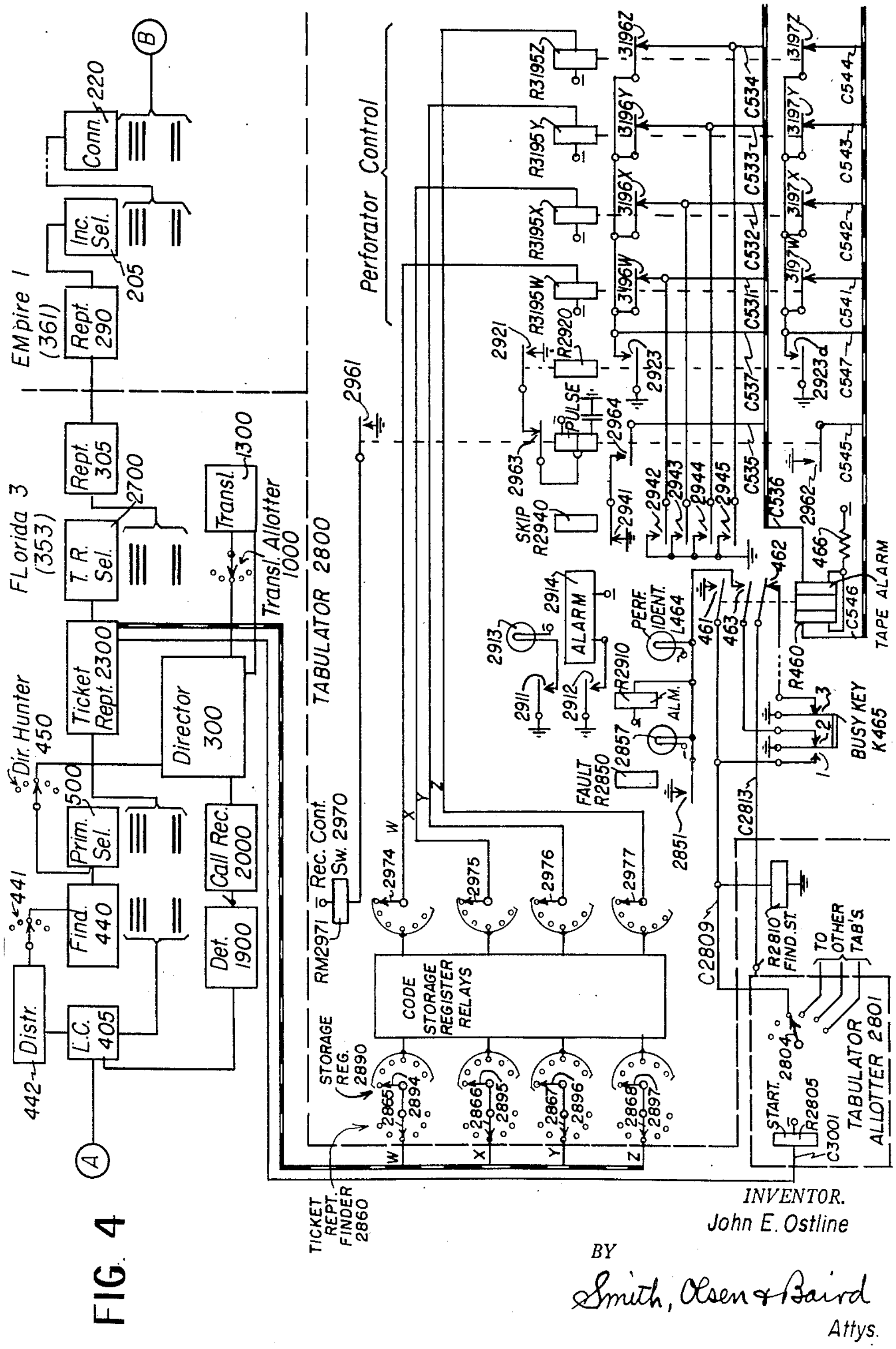

Referring now to Fig. 4 of the drawings, it will be assumed that the subscriber at substation A in the FLorida 3 exchange of the toll ticketing system desires to complete a toll connection to the subscriber at substation B, whose directory number is EMpire 1—1234. In response to the removal of the receiver from the switchhook by the subscriber at substation A, the line circuit 405, individually associated with the calling line, operates in the conventional manner to control the distributor 442. As a result thereof, the distributor 442 controls the rotary switch 441 to search for an idle finder, such as the finder 440. When the idle finder 440 is found it automatically searches for the calling subscriber line. As soon as the calling line is found by the line finder 440, the associated primary selector 500 is seized and it, in turn, causes the director hunter 450 to search for an idle director, such as the director 300. As a result of the seizure of the director 300, the usual dial tone signal is transmitted to the calling line in order to inform the calling subscriber thereon that his line has been connected to appropriate switching apparatus in the FLorida 3 exchange and that he may start dialing the digits constituting the directory number of the desired called subscriber at substation B.

The calling subscriber may now dial the called office code portion of the called subscriber directory number, comprising the letters E and M, and the exchange identifying digit 1, i. e., the digits 361, and then the numerical portion of the called subscriber directory number, comprising the digits 1234. All of the digits dialed by the calling subscriber are registered in the director 300 in order to cause the director to transmit switch setting impulses to the telephone exchange switching apparatus in both the FLorida 3 and the EMpire 1 exchanges. More specifically, the registration of the called office code digits 361 in the director 300 causes the translator allotter 1000 to connect the common exchange translator 1300 to the director 300 for its exclusive use. As a result of the latter operation, the translator 1300 is selectively controlled in accordance with the registered called office code digits 361 and thereby functions to simultaneously register in the director 300 one or more routing digits constituting a predetermined translation of the called office code digits 361, and a selective control for determining the particular digits of the registered called subscriber directory number which are to be transmitted by the director without translation in order to complete the desired telephone connection. Finally, the translator 1300 selectively controls the operation of the call recorder 2000, individually associated with the director 300, thereby to initiate the operation of the detector 1900 to detect and register the directory number of the particular calling subscriber at substation A. As soon as the routing digits have been registered in the director 300, the translator 1300 is connected therefrom and rendered available to perform a translation operation for any other director in the exchange.

In response to the registration of the routing digits the director 300 automatically operates to successively transmit switch setting impulses in accordance with each of the registered routing digits and then in accordance with the selected ones of the digits in the called subscriber directory number. During the time that the director 300 transmits the above noted switch setting impulses, the detector 1900 searches for the calling subscriber line and during the searching operation it registers the digits constituting the directory number of the particular calling subscriber substation in the call recorder 2000.

The switch setting impulses of the first digit, transmitted by the director 300, control the primary selector 500 to raise its wipers step-by-step, a number of steps corresponding to the number of impulses in the transmitted digit, to select a particular level in its associated contact bank and thereafter, the primary selector 500 automatically rotates its wipers step-by-step over the selected level to search for a set of bank contacts terminating an idle ticket repeater, such as the ticket repeater 2300. The second series of switch controlling impulses are repeated by the ticket repeater 2300 to the associated ticket repeater selector 2700. The last-mentioned selector is thereby controlled to raise its wipers step-by-step in a vertical direction to select a level corresponding to the number of impulses comprising the second digit. Thereafter the ticket repeater selector 2700 automatically rotates its wipers over the selected level to search for and seize an idle repeater, such as the repeater 305, terminating an idle toll line extending to the EMpire 1 exchange. The impulses of the next digit transmitted by the director 300 control the ticket repeater 2300, the repeater 305 and the repeater 290 to repeat the said impulses to the incoming selector 205 in the EMpire 1 exchange. The last-mentioned selector raises its wipers step-by-step in a vertical direction to select a level corresponding to the number of impulses in the digit transmitted and then rotates its wipers over the selected level to select an idle second selector. The number of groups of selectors provided in the EMpire 1 exchange will, of course, depend upon the trunking arrangement in the numbering scheme required to route the call to the appropriate hundreds group of connectors. In the present example it will be assumed that another selector (not shown) will operate in the same manner as the incoming selector 205 in response to the impulses of the next digit transmitted by the director 300 in order to select an idle connector, such as the connector 220. The connector 220, in response to the impulses of the next to the last digit and the final digit of the numerical portion of the called subscriber number transmitted by the director 300, will raise its wipers first in a vertical direction and then in a rotary direction to select the called subscriber line. It will be understood, however, that the connector 220 functions, in a conventional manner, first to test the called subscriber line to determine whether or not it is busy and, if the line tests idle, the connector will then transmit the usual ringing current in order to signal the called subscriber at substation B.

During the setting up of the above described connection under control of the director 300 it was pointed out that the ticket repeater 2300 was selected as a result of the transmission of the first routing digit to the primary selector 500. As soon as the ticket repeater 2300 is thus included in the connection it transmits a control signal back to the director 300 to indicate that the director may now start transferring the items of record information pertaining to the connection, which are now stored in the director 300 and in the call recorder 2000, to the ticket repeater 2300.

In response to the above-mentioned control signal, the director 300 transmits, in code form, the various items of record information temporarily registered therein as it continues to transmit the remaining switch controlling impulses to route the call to the desired called subscriber. For the purpose of this description it will be assumed that the items of record information transferred to the ticket repeater 2300 include the digits constituting the directory numbers of both the calling and the called subscribers, the digit indicative of the class of service of the calling station, the digits indicative of the rate at which the call is to be charged, and the digits indicative of the identity of the director involved in the connection. At this point it may be well to mention that the director 300 is interlocked with the call recorder 2000 so that it will not operate to transmit the impulses of the last digit of the called subscriber number unless the detector 1900 has completed its cycle of operation and has registered the digits of the directory number of the calling subscriber substation and unless the director 300 has completed its cycle of operation whereby all of the items of record information are transferred to the ticket repeater 2300. It should be noted that various units of equipment in the present telephone system employ code storage registering apparatus and code marking conductors for the purpose of registering, in code form, various digits comprising the items of record information and for transferring such registered digits from one unit of equipment to another. The combination code employed is generally referred to as a WXYZ code and is of the type wherein any digit from 1 to 9, inclusive, and 0 may be registered and transmitted by operating any one or any two of four WXYZ relays or by marking any one or any two of four WXYZ marking conductors in accordance with the following table:

| Digit: | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

Although the above combinational code employs a maximum of two relays for marking or registering any digit it should be understood, however, that it is also possible to operate the relays in additional combinations by employing different combinations of three of the four relays and by utilizing all four relays.

As soon as the director 300 has transferred all of the items of information stored therein to the ticket repeater 2300, it may then transmit the impulses of the final digit of the called subscriber directory number and thus complete the connection to the called subscriber line. Immediately thereafter the director 300 is automatically disconnected from the primary selector 500 and, as a result thereof, the telephone connection is completed between the calling subscriber at substation A and the called subscriber at substation B.

As soon as the called subscriber at substation B answers the call, the toll ticket repeater 2300 is controlled to initiate operation of conversational timing equipment therein which will accumulate the total conversation time. In response to the release of the connection by the calling subscriber, further operation of the timing equipment in the toll ticket repeater 2300 is terminated in order to register therein an additional item of record information which comprises the total elapsed conversational time, in minutes. As a further result of the release of the connection, all of the switching apparatus, except the toll ticket repeater 2300, will be restored to normal. The toll ticket repeater 2300, however, is held in its operated position and is marked busy until it has successfully transferred all of the items of record information stored therein to one of a plurality of tabulators, such as the tabulator 2800.

More specifically, upon the release of the connection, the ticket repeater 2300 applies ground potential to the conductor C3001, extending to the tabulator allotter 2801, thereby to operate the start relay R2805. As is schematically illustrated in the drawings, the tabulator allotter 2801 is provided with a rotary switch having a wiper 2804 which is adapted to be rotated over the associated bank contacts to search for an idle one of the tabulators. The conductor C2809 terminating in the bank contact accessible to the wiper 2804 is individual to the tabulator 2800 and the remaining conductors, similar to the conductor C2809, are individual to the remaining tabulators. As long as the tabulator 2800 and the associated record and ticket tape perforators 2967 and 2968 are available for use, the conductor C2809 will be marked with a resistance ground potential by way of the winding of the finder start relay R2810. However, if either one of the above noted perforators, or the associated tabulator 2800 are not available for use, the conductor C2809 will be marked with a direct ground potential to indicate a busy condition. In the latter event, the wiper 2804 will automatically rotate over the bank contact terminating the conductor C2809 in order to search for a conductor associated with an idle tabulator which is marked with a resistance ground potential.

For the purpose of this description it will be assumed that when the relay R2805 is operated, the wiper 2804 is in engagement with the conductor C2809 and it will also be assumed that the tabulator 2800 is idle. Since the conductor C2809 is not marked with a direct ground as noted above, the finder start relay R2810 is now operated in order to initiate the operation of the ticket repeater finder 2860. The last-mentioned finder is of the rotary stepping type and, for the purpose of this disclosure, four of its wipers 2865 to 2868, inclusive, have been illustrated. The last-mentioned wipers have access over the associated bank contacts to sets of four WXYZ conductors extending respectively to each of the ticket repeaters, such as the ticket repeater 2300, included in the telephone exchange. In response to the operation of the finder start relay R2810 the wipers of the ticket repeater finder 2860 are automatically rotated over the associated bank contacts to search for the calling ticket repeater 2300 and when the latter repeater is found, a circuit will be completed for causing the ticket repeater 2300 to transfer each of the digits of the various items of information stored therein to the code storage register relays, provided in the tabulator 2800, over the WXYZ marking conductors engaged by the wipers 2865 to 2868, inclusive. The last-mentioned transfer operation includes the storage register 2890 which is arranged to advance its wipers 2894 to 2897, inclusive, one step in a counterclockwise direction after each digit of an item of record information has been transferred to and registered in a connected group of four WXYZ code storage register relays. It should be understood, however, that the four WXYZ code storage register relays in each group are respectively connected to corresponding contacts accessible to the wipers 2894 to 2897, inclusive, in each contact position in the associated bank contacts.

In view of the foregoing description it should be understood that the storage register 2890 cooperates with a similar rotary switch provided in the ticket repeater 2300 to successively transfer each of the digits of each item of information stored in the ticket repeater 2300 to successive groups of WXYZ code storage register relays in the tabulator 2800. After all of the items of record information have been transferred, the ticket repeater 2300 is automatically released and rendered available for additional calls and it is also disconnected from the tabulator 2800. Consequently, all of the items of record information pertaining to the above described toll call are now stored in code form in the WXYZ code storage register relays in the tabulator 2800.

After the tabulator 2800 has received and registered a predetermined number of the items of record information in the code storage register relays, the hold relay R2920 will operate in the manner described in the previously noted Ostline application. As soon as the relay R2920 operates it completes, at its contacts 2923, a circuit including the conductor C537 for operating the motor start relay R520 provided in the ticket tape perforator 2968. It should be noted that the ticket tape perforator 2968 corresponds to the tape perforating mechanism 100 shown in Figs. 1 and 2 and that sufficient of the mechanical and electrical details thereof have been illustrated in Fig. 5 to enable the same to be described and understood. The motor start relay R520, which is mounted on the underside of the base 110 of the perforating mechanism 100, now operates and, at its contacts 521, completes a circuit including the conductors C522 and C523 for connecting the 110-volt 60 cycle commercial alternating current to the motor 171. The motor 171 now rotates the pulley 173, the spring drive 175, and the take-up reel pulley 174 in a clockwise direction, as seen in Fig. 5, in order to wind the slack in the tape 150 upon the take-up reel assembly. The tape 150, however, is restrained from being wound around the take-up reel, after the slack therein has been taken up, by means of the previously described feed pins **157*a* in the tape feed roll 157 and the slip-clutch arrangement including the pulleys 173 and 174, and the spring drive 175**.

Also, at its contacts 2923, the hold relay R2920 completes multiple circuits including respectively the contacts 3196W to 3196Z, inclusive, the conductors C531 to C534, inclusive, and the windings of the electromagnets 116W to 116Z, inclusive, in the ticket tape perforator 2968. At this instant the four magnets 116W to 116Z, inclusive, operate and actuate their magnet levers. In Fig. 5 the magnet lever for the electromagnet 116W has been designated 112W, 113W and 124W; the magnet lever for the electromagnet 116X has been designated 112X, 113X and 124X; the magnet lever for the electromagnet 116Y has been designated 112Y, 113Y and 124Y; and the magnet lever for the electromagnet 116Z has been designated 112Z, 113Z and 124Z in order to graphically represent the key levers 112W to 112Z, inclusive; the magnet levers 113W to 113Z, inclusive; and the vertical arms 124W to 124Z, inclusive, of the tape perforating mechanism 100 shown in Figs. 1 and 2. The above mentioned magnet levers are rotated in a clockwise direction, as seen in Fig. 5, about the stud 126 toward the above noted electromagnet and in response to this movement, the forwardly extending arms 129W to 129Z, inclusive, function to withdraw the punch controlling bars 134W to 134Z, inclusive, from between the upper ends of the punches 147W to 147Z, inclusive, and the undersurface of the punch hammer 135. From the foregoing it will be understood that when the hold relay R2920 initially operates, the perforator control relays R3195W to R3195Z, inclusive, are in their restored positions, and individual circuits are completed for operating each of the magnets 116W to 116Z, inclusive. At its contacts **2923*a*, the relay R2920 also completes corresponding circuits for controlling the record tape perforator 2967** in an identical manner.

Finally, the hold relay R2920 completes a circuit which may be traced from ground at its contacts 2921, the contacts 2963 and the upper winding of the pulse relay R2960, to battery. The pulse relay R2960 now operates and, at its contacts 2964, completes a circuit including ground at contacts 2941, the conductor C535 and the winding of the pulse relay R510, to battery. The pulse relay R510, which is also mounted on the underside of the base 110 of the perforating mechanism 100, now operates and, at its contacts 511, completes an obvious circuit for energizing the two coil windings of the punch magnet 138. Upon energizing, the punch magnet 138 attracts its armature 140 downwardly, thereby to actuate the plunger rod 142 and the punch hammer 135 in a corresponding direction. Since the punch controlling bars 134W to 134Z, inclusive, have been withdrawn from the upper ends of the punches 147W to 147Z, inclusive, the downward thrust of the punch hammer 135 drives only the central small diameter punch 147TL through the tape 150 into the punch block 146. In this manner, a single center feed hole is perforated in the tape 150.

As a further result of the operation of the pulse relay R2960, at its contacts 2963, it interrupts its initial energizing circuit but, due to the circuit including the upper and lower windings of the relay and the condenser connected in series therewith, the relay does not restore to normal immediately. The delay in the restoration period of the relay R2960 may be adjusted by varying the capacity of the condenser, included in the last-mentioned circuit. As a further result of the restoration of the relay R2960, at its contacts 2964, it interrupts a point in the previously described circuit for operating the pulse relay R510 which also restores to normal. Upon restoring, the relay R510 interrupts the circuit for the punch magnet 138, whereupon the magnet armature 140, the plunger rod 142 and the punch hammer 135 are restored to the normal positions shown in Fig. 5. Also, at this time, the center feed hole punch 147TL is withdrawn from the punch block 146 and the tape feed roll 157 is rotated in a clockwise direction to advance the tape 150 in the direction indicated by the arrow under control of the feed pins **157*a* therein which are in mesh with the center feed holes perforated in the tape 150. Since the motor 171 is in operation, the tape take-up reel assembly immediately winds the slack portion in the tape 150 upon the take-up reel. The slip-clutch arrangement, including the pulleys 173 and 174 and the drive spring 175, prevents the take-up reel from pulling upon the tape sufficiently to cause it to tear or break. The pulse relay R2960, at its contacts 2962, also controls a circuit including the conductor C545 extending to the record tape perforator 2967** in order to perform the same operations in the latter perforator.

Finally, the pulse relay R2960, at its contacts 2961, also completes an obvious circuit for operating the magnet RM2971 of the record control switch 2970. This magnet, upon operating, conditions the record control switch 2970 to advance its wipers 2974 to 2977, inclusive, one step in a counterclockwise direction. In the position illustrated in the drawings, that is the first contact positions of the wipers 2974 to 2977, inclusive, no potential is encountered for controlling any one of the perforator control relays R3195W to R3195Z, inclusive. At the end of the first operation of the pulse relay R2960 it restores to normal, as previously noted, and at its contacts 2961 it interrupts the circuit of the magnet RM2971, thereby to restore the magnet to normal and cause it to advance its wipers 2974 to 2977, inclusive, one step into engagement with the second set of contacts in the associated contact banks. These contacts are normally grounded and circuits are thereby completed for operating each of the four perforator control relays R3195W to R3195Z, inclusive. Upon operating, these relays, at their respective contacts 3196W to 3196Z, inclusive, interrupt the previously described circuits including the conductors C531 to C534, inclusive, thereby to restore the four electromagnets 116W to 116Z, inclusive, to normal. With these magnets in their restored positions, the punch controlling bars 134W to 134Z, inclusive, are again interposed between the associated punches 147W to 147Z, inclusive, and the punch hammer 135. At the contacts 3197W to 3197Z, inclusive, the perforator control relays also interrupt the circuits including the conductors C541 to C544, inclusive, thereby to restore the corresponding electromagnets in the record perforator 2976 to normal.

In response to the next operation of the pulse relay R2960, the circuit including the contacts 2964 and the conductor C534 will be recompleted in order to operate the pulse relay R510 and the punch magnet 138, whereby the punch hammer drives the punches 147W to 147Z, inclusive, and the punch 147TL downwardly through the tape 150 to perforate a start indication therein. The same indication is perforated in the tape of the record tape perforator 2967 under control of the contacts 2962 on the pulse relay R2960. Finally, the pulse relay R2960, at its contacts 2961, completes the circuit for operating the magnet RM2971 of the record control switch 2970 whereby the wipers thereof are conditioned to be advanced an additional step in the counterclockwise direction.

At the end of the second operation of the pulse relay R2960 it again restores to normal, as previously noted, and at its contacts 2961 it interrupts the circuit of the magnet RM2971. The magnet, upon restoring, advances its wipers 2974 to 2977, inclusive, one step into engagement with the third set of bank contacts which terminate four WXYZ marking conductors individual to the first set of four WXYZ code storage register relays which have stored therein, in code form, a digit corresponding to at least a portion of one of the items of record information. These code storage register relays will apply ground potential to the wipers 2974 to 2977, inclusive, in accordance with the previously noted code in order to operate the corresponding perforator control relays R3195W to R3195Z, inclusive. For the purpose of this description it will be assumed that the digit 6 has been stored in the connected set of four WXYZ code storage register relays and that, as a result thereof, the perforator control relays R3195Y and R3195Z are operated. Upon operating these relays, at their respective contacts 3196Y and 3196Z, interrupt the previously described circuits including respectively the conductors C533 and C534, thereby to restore the electromagnets 116Y and 116Z in the ticket tape perforator 2968 to their normal positions. The remaining two magnets 116W and 116X, however, remain in their operated positions over the circuits including the contacts 3196W and 3196X of the restored perforator control relays R3195W and R3195X. In this manner the magnets 116Y and 116Z are conditioned so that the corresponding punch controlling bars 134Y and 134Z are interposed between the upper ends of the associated punches 147Y and 147Z and the punch hammer 135, and the magnets 116W and 116X are conditioned so that the punch controlling bars 134W and 134X remain withdrawn from between the upper ends of their associated punches 147W and 147Z and the punch hammer 135. The circuits for conditioning the magnets of the record tape perforator 2967 are also controlled at the contacts 3197W to 3197Z, inclusive, of the perforator control relays R3195W to R3195Z, inclusive.

The above described circuits for conditioning the record and ticket tape perforators 2967 and 2968 are completed as soon as the pulse relay R2960 restores to normal the second time. Accordingly, the third time the pulse relay R2960 operates it controls the two perforators to perforate the tape, in code form, in accordance with the digit 6. More specifically, the pulse relay R2960 upon reoperating the third time completes, at its contacts 2964, the previously described circuit for operating the pulse relay R510, whereby the punch magnet 138 causes the punch hammer 135 to drive the punches 147Y and 147Z associated with the punch controlling bars 134Y and 134Z and the center punch 147TL downwardly in order to perforate the tape 150. As a further result of the reoperation of the pulse relay R2960 a circuit is again completed for operating the magnet RM2971. The pulse relay R2960, thereafter restores to normal and again interrupts, at its contacts 2964, the circuit for the pulse relay R510 in order to permit the punches, the punch hammer and the punch magnet to restore to normal. Also, at its contacts 2961, the pulse relay R2960 interrupts the circuit for the magnet RM2971 which now restores to normal and advances the wipers 2974 to 2977, inclusive, into engagement with contacts terminating the next set of four WXYZ code storage register relays. As soon as the above wipers are advanced from the engaged set of contacts, the operated ones of the perforator control relays R3195W to R3195Z, inclusive, are restored to normal in order to recomplete the previously described circuits for operating the four magnets 116W to 116Z, inclusive. Consequently, the punch controlling bars 134W to 134Z, inclusive, are all withdrawn from between the upper ends of the punches 147W to 147Z, inclusive, and the punch hammer 135.

As soon as the wipers 2974 to 2977, inclusive, engage the next set of four WXYZ code storage register relays the perforator control relays R3195W to R3195Z, inclusive, will be reoperated, either individually or in combinations, in accordance with the digit of the item of information stored in the associated code storage register relays. The operated perforator control relays will again control the magnets 116W to 116Z, inclusive, so that the punch controlling bars 134W to 134Z, inclusive, of the restored ones of the magnets will again be interposed between the corresponding ones of the punch magnets 147W to 147Z, inclusive, and the punch hammer 135. The next operation of the pulse relay R2960 will cause the punch magnet 138 to actuate the punch hammer 135 and perforate the tape 150 with holes corresponding to the digit of the stored item of record information.

By referring to Fig. 3, it will be seen that the small center feed hole is perforated in the tape 150 each time the punch hammer 135 is actuated and that four holes in alignment with one of the small feed holes are perforated to indicate the start of the items of record information pertaining to a particular telephone call. Thereafter, different digits comprising the various items of information are perforated in the tape 150 in accordance with the four channel code shown in Fig. 3.

From the foregoing description of operation of the perforator control relays R3195W to R3195Z, inclusive, it will be understood that these relays are successively operated, in code form, in accordance with the particular digits included in the item of information stored in the particular group of WXYZ code storage register relays selected by the wipers of the record control switch 2970. It will also be understood that each operation of the pulse relay R2960 controls both the ticket tape perforator 2968 and the record tape perforator 2967 to perforate the tape, in code form, in accordance with the operated and restored conditions of the four perforator control relays.

In the previous description, however, it was pointed out that the record tape perforator 2967 is controlled to perforate its tape with items of record information pertaining to the identity of certain common units of apparatus utilized in completing a toll call and that such items of information are not perforated on the tape of the ticket tape perforator 2968. In the present circuit arrangement this is accomplished by operating the skip relay R2940 each time the wipers of the record control switch 2970 engage contacts in their associated banks terminating the WXYZ code storage register relays having registered therein the information pertaining to the identity of such common apparatus. It may be well to mention at this time, however, the skip relay R2940 may be operated to prevent the ticket tape perforator 2968 from perforating any other items of record information while permitting the record tape perforator 2967 to record such items of record information.

The skip relay R2940 is operated simultaneously with the advancement of the wipers of the record control switch 2970 into engagement with a set of WXYZ code storage register relays having registered therein a digit of an item of information pertaining to the identity of a common unit of apparatus. The perforator control relays R3195W to R3195Z, inclusive, will be operated in the manner previously described in accordance with the digit of the item of information, but the operated condition of the skip relay R2940 will prevent the perforator control relays from exercising any control over the corresponding magnets 116W to 116Z in the ticket tape perforator 2968. More specifically, in its operated position the skip relay R2940, at its contacts 2941, removes the operating ground potential from the conductor C535, thereby to prevent the pulse relay R510 from actuating the punch magnet 138 in the ticket tape perforator 2968. Also, at its contacts 2942 to 2945, inclusive, the skip relay R2940 applies ground potential to the conductors C531 to C534, inclusive, thereby to maintain the four magnets 116W to 116Z, inclusive, of the ticket tape perforator 2968 in their operated positions with the punch controlling bars 134W to 134Z, inclusive, withdrawn from the upper ends of the associated punches 147W to 147Z, inclusive. Consequently, the skip relay R2940 prevents any of the contacts 3196W to 3196Z on the perforator control relays from restoring any of the magnets 116W to 116Z, inclusive. However, the perforator control relays, at their respective contacts 3197W to 3197Z, inclusive, will control the corresponding magnets in the record tape perforator 2967 in accordance with the digit of the item of information registered in the connected WXYZ code storage register relays. This digit will be perforated on the tape of the record tape perforator 2967 in response to the next operation of the pulse relay R2960. As previously noted, the relay R2960, at its contacts 2962, applies ground potential to the conductor C545 in order to operate the pulse relay and the punch magnet provided in the record tape perforator 2967. In view of the foregoing description it will be apparent that the operated condition of the skip relay R2940 will prevent the perforator control relays from exercising the usual perforating control over the ticket tape perforator 2968, while at the same time it permits the perforator control relays to exercise the perforating control over the record tape perforator 2967.

When all of the items of record information stored in the code storage register relays of the tabulator 2800 have been perforated by the ticket tape perforator 2968 and the record tape perforator 2967, the hold relay R2920 will be restored to normal in order to terminate further pulsing of the pulse relay R2960. As a further result of the restoration of the hold relay R2920, at its contacts 2923 and **2923*a*, it removes ground potential from the conductors extending to the magnets of the record and the ticket tape perforators 2967 and 2968 and from the conductors for controlling the motor start relays in the above noted perforators. Consequently, the motor start relays will now restore to normal and disconnect the take-up reel motors from the commercial power source. As a further result of the restoration of the hold relay R2920, the storage register 2890, the record control switch 2970, and the code storage register relays in the tabulator 2800 are restored to normal, thereby to render the tabulator and its associated tape perforators 2967 and 2968** available to record the items of record information pertaining to another toll call.

In describing the mechanical details of the tape perforator 100 illustrated in Figs. 1 and 2, it was pointed out that the mechanism is provided with a tape supply testing arm 154 for determining the adequacy of the supply of unperforated tape on the supply reel 151. It was also pointed out that the mechanism is provided with a tape tension lever 153 for determining whether or not the tape 150 between the tape feed roll 157 and the reel 151 is broken or torn.

Referring now to Fig. 5, it will be seen that the tape supply testing arm 154 is pivotally supported on a stud 155 so that it normally engages the peripheral surface on the roll of tape 150. It will also be noted that when the supply of tape becomes inadequate a projection on the arm 154 will control the tape-out lever to open its contacts 513 and to close its contacts 514. These contacts are of the snap-acting type so that very little pressure is required to actuate the contacts in the manner noted above. It will also be noted that the tape tension lever 159 is in engagement with the tape 150 at a point between the supply roll and the tape feed roll 157. As long as the tape 150 is intact and under tension, the tape tension lever 153 is in an actuated position with the contacts 516 closed and the contacts 515 open. However, when the tape breaks or is torn the tension lever 153 will move with a snap-action to cause the tape-break lever to close the contacts 515 and to open the contacts 516.

With the tape-out lever and the tape-break lever retained in the positions illustrated in the drawing, by an adequate supply of tape on the supply roll and by the proper tension on the tape 150, a circuit may be traced from ground via the contacts 516 and 513, the conductor C536, the right-hand winding of the tape alarm relay R460 and the resistor 466, to battery. This circuit energizes the right-hand winding of the relay R460 but the relay will not actuate its associated contacts unless an energizing circuit is simultaneously completed through its left-hand winding. In other words, the left and right-hand windings of the relay R460 must be energized in order to control the associated contacts and if the energizing circuit for either, or both, of the windings thereof is broken, the contacts of the relay will be restored to normal. The energizing circuit for the left-hand winding of the tape alarm relay R460 includes identical contacts of tape-break and a tape-out testing arrangement in the record tape perforator 2967, the conductor C546, the left-hand winding of the tape alarm relay R460 and the resistor 466. Accordingly, the left and right-hand windings of the relay R460 are normally energized to retain the contacts on the relay in the positions illustrated in the drawings as long as both the ticket tape perforator 2968 and the record tape perforator 2967 are in condition to be utilized to perforate the tape with the items of record information pertaining to a toll call.

If the tape in either the perforator 2967 or the perforator 2968 breaks, the contacts 516 will be opened, as previously noted, thereby to interrupt the circuit for either the left or the right-hand windings of the relay R460 and thereby cause the relay to restore to normal. The same event will occur if the supply of tape on the supply reel becomes inadequate and causes the tape-out lever to interrupt the circuits at the contacts 513 in either of the perforators. It will be noted that at the contacts 515, the tape-break lever also completes an obvious circuit for illuminating the tape-out and tape-break signal lamp L180 which is individual to the particular perforator 2968. On the other hand, if the contacts 514 are closed to indicate the inadequate supply of tape, an obvious circuit will be completed for illuminating the lamp L180. Accordingly, the lamp L180 will be illuminated to indicate to the exchange attendant that the particular tape perforator is in trouble either because the tape between the supply reel and the tape feed roll has been severed, or that an inadequate supply of tape remains upon the supply reel.

Referring now to the tape alarm relay R460, it will be seen that in the operated position illustrated in the drawings, a circuit is completed which may be traced from ground via the contacts 3 of the busy key K465, the contacts 462, and the conductor C2813 extending to the tabulator allotter 2801. The conductor C2813 is normally connected to all of the tabulators in the telephone exchange and as long as ground potential is retained upon this conductor an indication is given to the tabulator allotter 2801 that an idle tabulator, such as the tabulator 2800, is available for use. Consequently, when the wiper 2804 rotates to search for an idle tabulator, the conductor C2809 individual to the tabulator 2800, is marked idle by the resistance ground potential thereon which is supplied through the windings of the finder start relay R2810. If the wiper 2804 selects the conductor C2809 of the idle tabulator 2800, the finder start relay R2810 will operate and cause the ticket repeater finder 2860 to search for the calling ticket repeater in the manner previously described.

In the event that the circuit for either the left or right-hand windings of the tape alarm relay R460 is interrupted as a result of a break in the tape or as the result of an inadequate supply of tape on either of the associated perforators, the relay R460 restores to normal. When this occurs the contacts 462 are opened in order to remove the ground potential from the conductor C2813. If, at this instant, all of the other tabulators are unavailable, the tabulator allotter 2801 will not attempt to search for an idle tabulator even though its start relay R2805 is in an operating position. Also, at its contacts 461, the restored relay R460 applies a direct ground potential to the conductor C2809 in order to short-circuit the associated finder start relay R2810 and in order to mark the tabulator 2800 busy in the bank contacts of the wiper 2804 of the tabulator allotter 2801. Finally, at its contacts 463 the restored relay R460 completes a circuit from ground at contacts 2 of the busy key K465 for illuminating the perforator identifying lamp L464 and for operating the alarm relay R2910. The illuminated condition of the lamp L464 indicates to the exchange attendant that the perforators associated with the tabulator 2800 require his attention.

As soon as the alarm relay R2910 operates, it completes at its contacts 2911 and 2912, a circuit for illuminating the lamp 2913 and a circuit for operating the audible alarm 2914. The lamp 2913 and the alarm 2914 are common exchange signals and indicate to the exchange attendant that the tabulator equipment is at fault and needs his attention. Having received the common exchange signals and the individual tabulator signal, the exchange attendant may take the necessary steps to correct the broken tape or the inadequacy of the supply of tape on the perforator.

At this point it should be noted that an additional circuit may be completed for controlling the alarm relay R2910 in the event that a fault occurs in the tabulator 2800. More specifically, when such a fault occurs, the fault relay R2850 is operated and, at its contacts 2851, completes a circuit for illuminating the tabulator identifying lamp 2857 and for operating the alarm relay R2910. As previously explained, the relay R2910 controls the common exchange lamp 2913 and the alarm 2914 to signal the exchange attendant, and the lamp 2857 being illuminated, indicates to the exchange attendant that the particular tabulator 2800 is in trouble.

After the exchange attendant has corrected the fault in the perforator, the tape-break contacts 515 and 516 will be restored to the position illustrated in Fig. 5 if the fault resulted from a break in the tape, and the contacts 513 and 514 will be restored to the positions illustrated in Fig. 5, if the fault occurred as a result of an inadequate supply of tape. In either event the correction of the fault will cause the tape-out and tape-break signal lamp L180 to be extinguished and it will cause the energizing circuits to be recompleted for the two windings of the tape alarm relay R460 in order to operate the relay. As soon as the relay R460 reoperates, it removes the busy marking direct ground potential from the conductor C2809, at its contacts 461; at its contacts 462, it reapplies ground potential to the conductor C2813; and, at its contacts 463, it interrupts the previously described circuit for operating the alarm relay R2910 and for illuminating the perforator identifying lamp L464. If the fault occurred in the tabulator 2800, the exchange attendant, after correcting the same, will cause the fault relay R2850 to restore to normal, thereby to interrupt the alternative circuit for the alarm relay R2910 and the tabulator identifying lamp 2857.

If the exchange attendant desires to busy the tabulator 2800 and its associated ticket and tape perforators 2968 and 2967, he may actuate the busy key K465. In its actuated position, the busy key K465, at its contacts 1, applies the busy marking direct ground potential to the conductor C2809; at its contacts 2, it removes the operating ground potential from the contacts 463; and at its contacts 3, it removes the ground potential from the contacts 462. Accordingly, the tabulator 2800 is marked busy over the conductor C2809, and the circuit for controlling the perforator identifying lamp L464 and the alarm relay R2910 is interrupted regardless of the operated or restored position of the tape alarm relay R460. The busy key K465 may be restored to normal whenever the exchange attendant desires to again place the tabulator 2800 into service.

In describing the mechanical details of the tape perforator 100 illustrated in Figs. 1 and 2, it was pointed out that the mechanism is provided with a manually operable tape loading key 112TL. This key is provided, as previously noted, to enable the exchange attendant to feed the tape 150 through the punch block 146, and for controlling the perforator to perforate only the center feed hole in the associated tape 150. Referring now to Fig. 5, it will be seen that the tape loading key 112TL includes the contacts 131 and 132 which are mechanically closed whenever the key 112TL is actuated. Also, the key lever 112TL, as previously described, is constructed and arranged so that it mechanically controls the four punch controlling bars 134W to 134Z, inclusive, in order to withdraw them from between the upper ends of the associated punches 147W to 147Z, inclusive, and the punch hammer 135. Also, the actuation of the key lever 112TL, after having withdrawn the punch controlling bars as noted above, causes the contacts 131 and 132 to close in order to complete an obvious circuit for operating the pulse relay R510. The relay R510, at its contacts 511, completes a circuit for energizing the windings of the punch magnet 138, whereby the punch hammer 135 actuates the center punch 147TL to perforate the small center feed hole in the tape 150. Upon the release of the key lever 112TL, the above described circuits are interrupted in order to restore the punch hammer 135 to normal and to cause the tape feed roll 157 to rotate one step. Each actuation of the key lever 112TL controls the tape perforator to perforate an additional small feed hole in the associated tape 150 and the tape feed roll 157 is rotated one step to advance the tape an additional character space under control of the pins 157*a* therein which mesh with the perforated feed holes in the tape. After sufficient tape has been perforated in this manner the free end thereof may be wound around one of the studs in the take-up reel as previously described.

While one embodiment of the invention has been disclosed, it will be understood that various modifications may be made therein which are within the true spirit and scope of the invention.

What is claimed is:

1. In a toll ticketing telephone system, a data storage device for storing digits indicative of items of record information pertaining to a telephone connection; the combination comprising a tape perforator associated with said device, a group of magnets and a tape punch mechanism and a pulse relay in said tape perforator, said tape punch mechanism including a group of tape punches and a punch hammer, means in said device for controlling said magnets individually or in combinations in accordance with a code indicative of a particular digit in an item of record information stored therein and for conjointly operating said pulse relay, means controlled by said magnets for selectively conditioning said group of tape punches in accordance with said code of said particular digit, and means responsive to the operation of said pulse relay for operating said punch hammer to cause said group of tape punches to perforate said tape in accordance with said selective condition of said group of tape punches.

2. In a toll ticketing telephone system, a data storage device having storage relays for storing digits indicative of various items of record information pertaining to a telephone connection; the combination comprising a tape perforator associated with said device, a group of magnets in said perforator, a corresponding group of control relays in said device, switching means in said device selectively operative for successively connecting said control relays to said storage relays in order successively to operate said control relays individually or in combinations in accordance with a code indicative of the particular digits of the items of information stored in said successively connected storage relays, a perforating mechanism in said perforator, means controlled by said control relays for selectively controlling corresponding ones of said magnets to selectively condition said perforating mechanism to perforate a tape to record in code form each of said stored digits, a pulse relay and a punch magnet in said perforator, means in said device controlled in timed cycles for operating said pulse relay and for thereafter restoring said pulse relay and for thereafter operating said switching means, means controlled incident to each operation and restoring of said pulse relay for operating and restoring said punch magnet, and means controlled incident to each operation of said punch magnet for actuating said perforating mechanism to perforate said tape in accordance with said selective condition of said perforating mechanism, whereby said tape is perforated at timed intervals in accordance with digits stored in said storage relays.

3. In a toll ticketing telephone system, a data storage device having a plurality of groups of storage relays for storing digits indicative of various items of record information pertaining to a telephone connection in a predetermined order; the combination comprising a tape perforator, a perforating mechanism in said tape perforator including a plurality of tape punches and a punch hammer, a selecting mechanism for controlling the tape punches of said perforating mechanism, a plurality of magnets for selectively controlling said selecting mechanism, a plurality of marking relays in said device for selectively controlling said magnets, means in said device for selectively connecting said plurality of marking relays to a group of said storage relays in order selectively to operate said marking relays individually or in combinations in accordance with a code indicative of the digit of the item of information stored in the particular selected group of storage relays, means governed by said marking relays for controlling said magnets in order selectively to control said selecting mechanism, and means in said device for operating the punch hammer of said perforating mechanism to cause said plurality of tape punches to perforate a tape in accordance with said selective control of said selecting mechanism, whereby said tape is perforated in accordance with a code indicative of the digit of the item of record information stored in said particular group of storage relays.

4. In a toll ticketing telephone system, a data storage device having a plurality of groups of storage relays for storing digits indicative of various items of record information pertaining to a telephone connection in a predetermined order; the combination comprising a tape perforator, a perforating mechanism in said tape perforator including a plurality of tape punches and a punch hammer, a selecting mechanism for controlling the tape punches of said perforating mechanism, a plurality of magnets for selectively controlling said selecting mechanism, a plurality of marking relays in said device for selectively controlling said magnets, switching means in said device selectively operative for connecting said plurality of marking relays to said groups of storage relays one after another in order selectively to operate said marking relays individually or in combination in accordance with a code indicative of each of the digits of the various items of record information stored in each of the successively selected groups of storage relays, means governed in accordance with each of said selective operations of said marking relays for controlling said magnets selectively to control said selecting mechanism, and means in said device for operating said punch hammer and for thereafter restoring said punch hammer and for thereafter operating said switching means mechanism and for thereafter restoring said perforating mechanism and for thereafter operating said switching means thereby to cause said plurality of tape punches to perforate said tape in accordance with a code indicative of the digits of the different items of information stored in the successively connected groups of storage relays.

5. In a toll ticketing telephone system, a data storage device having a plurality of groups of storage relays for storing digits indicative of various items of record information pertaining to a telephone connection in a predetermined order; the combination comprising a tape perforator, a perforating mechanism in said tape perforator, a selecting mechanism for controlling said perforating mechanism, a plurality of magnets for selectively controlling said selecting mechanism, a plurality of marking relays in said device for selectively controlling said magnets, switching means in said device selectively operative for connecting said plurality of marking relays to a group of said storage relays in order selectively to operate said marking relays individually or in combinations in accordance with the digit of the item of information stored in the particular selected group of storage relays, means governed by said marking relays for controlling said magnets in order selectively to control said selecting mechanism, an impulsing relay in said device operated and restored in timed cycles, means responsive to each operation and restoring of said impulsing relay for operating and restoring said perforating mechanism in order to perforate a tape to record thereon, in code form, the digit of the item of record information stored in said particular selecting group of storage relays, and additional means controlled by each restoring of said impulsing relay for operating said selecting means to connect said plurality of marking relays to another group of said storage relays, whereby said perforating mechanism is operated at timed intervals to perforate said tape in accordance with the digits stored in said storage relays.

6. In a toll ticketing telephone system including a toll ticket repeater having registered therein digits indicative of various items of record information pertaining to a telephone connection; the combination of a tape perforator and a tape perforator controller associated with the toll ticket repeater and controllable for producing on tape a recording of the digits stored in the toll ticket repeater and comprising storage relays in said controller operative for storing the digits registered in the toll ticket repeater, a control relay in said controller operated responsive to said tape perforator being operable for perforating a tape and restored responsive to said tape perforator being non-operable for perforating a tape, means responsive to the operated state of said control relay for rendering said tape perforator controller accessible to the toll ticket repeater, whereby the digits stored in the toll ticket repeater are transferred to and stored in the storage relays of said controller, a group of selectively energizable magnets and a tape punch mechanism in said tape perforator, said tape punch mechanism being selectively controlled in accordance with the energization of said magnets, means responsive to the storing of said digits in said storage relays for successively energizing said magnets in said groups in accordance with the individual digits stored in said storage relays in order to selectively control said tape punch mechanism and for conjointly operating said controlled tape punch mechanism in order to produce successive perforations on said tape corresponding to the individual stored digits, and means responsive to the restored state of said control relay for rendering said tape perforator controller inaccessible to the toll ticket repeater.

7. In a toll ticketing telephone system including a toll ticket repeater having registered therein digits indicative of various items of record information pertaining to a telephone connection; the combination of a tape perforator and a tape perforator controller associated with the toll ticket repeater and controllable for producing a record of the digits stored in the toll ticket repeater; said tape perforator of said combination comprising a punch mechanism, a rotatable reel adapted to support a roll of tape, means for feeding said tape from said roll into perforating relation to said punch mechanism, an electromagnet, means controlled in response to the energization of said electromagnet for actuating said punch mechanism to perforate said tape and controlled in response to de-energization of said electromagnet for restoring said punch mechanism and for controlling said feeding means to feed a predetermined amount of tape from said roll, means including a testing element adapted to cooperate with said roll of tape, and a switch normally biased to a first position by said testing element and operated to a second position by said testing element in response to an inadequate supply of tape on said reel; said tape perforator controller of said combination comprising a control relay operated responsive to said switch being in said first position, means responsive to the operated state of said control relay for rendering said tape perforator controller accessible to the toll ticket repeater, whereby the digits stored in the toll ticket repeater are transferred to and stored in the storage relays of said controller, means responsive to the storing of the digits in said storage relays for successively controlling said tape perforator and for successively energizing and de-energizing the electromagnet thereof to perforate said tape in accordance with said digits stored in said storage relays, and means responsive to the restored state of said control relay for rendering said tape perforator controller inaccessible to the toll ticket repeater and for rendering an indication of an inadequate supply of tape.

8. In a toll ticketing telephone system including a toll ticket repeater having registered therein digits indicative of various items of record information pertaining to a telephone connection; the combination of a tape perforator and a tape perforator controller associated with the toll ticket repeater and controllable for producing on tape a record of the digits stored in the toll ticket repeater; said tape perforator of said combination comprising a tape perforating mechanism, a rotatable reel on said mechanism for supporting a roll of tape, a punch mechanism, means for feeding said tape from said reel into perforating relation with said punch mechanism, a lever for maintaining a predetermined tension on said tape between said feeding means and said reel, a tape tension test lever in engagement with a surface of said tape normally held in a first position by said predetermined tension on said tape and adapted to be moved to a second position responsive to the tension on said tape being less than said predetermined tension, and means responsive to each operation of said punch mechanism for controlling said feeding means to advance said tape a predetermined distance; said tape perforator controller of said combination comprising a control relay operated responsive to said tension test lever being in said first position, means responsive to the operated state of said control relay for rendering said tape perforator controller accessible to the toll ticket repeater, whereby the digits stored in the toll ticket repeater are transferred to and stored in the storage relays of said controller, means responsive to the storing of the digits in said storage relays for successively controlling said tape perforating mechanism and for successively operating and restoring said punch mechanism thereof to perforate said tape in accordance with the digits stored in said storage relays, and means responsive to the restored state of said control relay for rendering said tape perforator inaccessible to the toll ticket repeater.

9. In a toll ticketing telephone system including a toll ticket repeater having registered therein digits indicative of various items of record information pertaining to a telephone connection; the combination of a tape perforator controller associated with the toll ticket repeater and controllable for producing on tape a record of the digits stored in the toll ticket repeater; said tape perforator of said combination comprising a support for a roll of tape carried by said tape perforator, a switch having a first position and a second position, and a pivoted arm tensioned normally to engage said roll and adapted to move said switch from said first position to said second position in response to an inadequate supply of tape on said roll; said tape perforator controller of said combination comprising a control relay operated responsive to said switch being in said first position and restored responsive to said switch being in said second position, means responsive to the operated state of said control relay for rendering said tape perforator controller accessible to the toll ticket repeater, whereby the digits stored in the toll ticket repeater are transferred to and stored in the storage relays of said controller, means responsive to the storing of the digits in said storage relays for operating said tape perforator to perforate said tape in accordance with the digits stored in said storage relays, an alarm device, and means responsive to the restored state of said control relays for rendering said tape perforator controller inaccessible to the toll ticket repeater and for operating said alarm device to indicate an inadequate supply of tape on said reel.

10. In a toll ticketing telephone system including a toll ticket repeater having registered therein digits indicative of various items of record information pertaining to a telephone connection; the combination of a first tape perforator and a second tape perforator and a tape perforator controller associated with the toll ticket repeater and controllable for producing on a corresponding first tape and on a corresponding second tape records of the digits stored in the toll ticket repeater and comprising storage relays in said controller operative for storing the digits registered in the toll ticket repeater, a control relay in said controller operated responsive to said first and second tape perforators being operable for perforating a tape and restored responsive to either one of said first and second tape perforators being nonoperable for perforating a tape, means responsive to the operated state of said control relay for rendering said tape perforator controller accessible to the toll ticket repeater, whereby the digits stored in the toll ticket repeater are transferred to and stored in the storage relays of said controller, a group of selectively energizable magnets and a tape punch mechanism in each of said first and second tape perforators, each of said tape punch mechanisms being selectively controlled in accordance with the energization of the magnet in the corresponding group, means responsive to the storing of said digits in said storage relays for successively energizing the magnets in said groups in accordance with the individual digits stored in said storage relays in order to selectively control the corresponding tape punch mechanism and for conjointly operating said controlled tape punch mechanisms in order to produce successive perforations on said tapes corresponding to the individual stored digits, and means responsive to the restored state of said control relay for rendering said tape perforator controller inaccessible to the toll ticket repeater.

11. In a toll ticketing telephone system including a toll ticket repeater having registered therein digits indicative of various items of record information pertaining to a telephone connection; the combination of a first tape perforator and a second tape perforator and a tape perforator controller associated with the toll ticket repeater and controllable for producing on corresponding first and second tapes records of the digits stored in the toll ticket repeater and comprising storage relays in said controller operable for storing the digits registered in the toll ticket repeater, a control relay in said controller including a first winding energized responsive to said first tape perforator being operable for perforating said corresponding first tape and a second winding energized responsive to said second tape perforator being operable for perforating said corresponding second tape, whereby said control relay is operated responsive only to said first and second windings being energized, means responsive to the operated state of said control relay for rendering said tape perforator controller accessible to the toll ticket repeater, whereby the digits stored in the toll ticket repeater are transferred to and stored in the storage relays of said controller, a group of selectively energizable magnets and a tape punch mechanism in each of said first and second tape perforators, each of said tape punch mechanisms being selectively controlled in accordance with the energization of the magnets of the corresponding group, means responsive to the storing of said digits in said storage relays for successively energizing the magnets in said groups in accordance with the individual digits stored in said storage relays in order to selectively control said tape punch mechanisms and for conjointly operating said controlled tape punch mechanisms in order to produce successive perforations on said first and second tapes corresponding to the individual stored digits, and means responsive to the restored state of said control relay for rendering said tape perforator controller inaccessible to the toll ticket repeater.

12. In a toll ticketing telephone system including a toll ticket repeater having registered therein digits indicative of various items of record information pertaining to a telephone connection; the combination of a first tape perforator and a second tape perforator and a tape perforator controller associated with the toll ticket repeater and controllable for producing on a corresponding first tape and a corresponding second tape a record of the digits stored in the toll ticket repeater; each of said first and second tape perforators of said combination comprising a punch mechanism, a rotatable reel supporting a roll of tape, means for feeding said tape from said roll into perforating relation with said punch mechanism, an electromagnet, means controlled responsive to energization of said electromagnet for actuating said punch mechanism to perforate said corresponding tape and controlled responsive to de-energization of said electromagnet for restoring said punch mechanism and for controlling said feeding means to feed the corresponding tape a predetermined distance, means including a testing element adapted to cooperate with the corresponding roll of tape, and a switch normally biased to a first position by said testing element and operated to a second position by said testing element in response to an inadequate supply of tape on the associated roll; said tape perforator controller of said combination comprising a control relay including a first winding energized responsive to said switch in said first tape perforator being in said first position and being de-energized responsive to said switch in said first tape perforator being in said second position and including a second winding energized responsive to the switch in said second tape perforator being in said first position and de-energized responsive to said switch in said second tape perforator being de-energized, whereby said control relay is operated responsive to said first and second windings being energized and is restored responsive to either one of said first or second windings being de-energized, means responsive to the operated state of said control relay for rendering said tape perforator controller accessible to the toll ticket repeater, whereby the digits stored in the toll ticket repeater are transferred to and stored in the storage relays of said controller, means responsive to the storing of the digits in said storage relays for successively controlling said first and second tape perforators and for successively energizing the electromagnets thereof to perforate said first and second tapes in accordance with the digits stored in said storage relays, and means responsive to the restored state of said control relay for rendering said tape perforator controller inaccessible to said toll ticket repeater and for rendering an indication of an inadequate supply of tape on the reels of said first and second perforators.

13. In a toll ticketing telephone system including a toll ticket repeater having registered therein digits indicative of various items of record information pertaining to a telephone connection; the combination of a first tape perforator and a second tape perforator and a tape perforator controller associated with the toll ticket repeater and controllable for producing on a corresponding first tape and a corresponding second tape records of the digits stored in the toll ticket repeater; each of said first and second tape perforators of said combination comprising a tape perforator mechanism, a rotatable reel supporting a roll of tape, a punch mechanism, means for feeding said tape from said reel into perforating relation to said punch mechanism, a lever tensioned to maintain a predetermined tension on said tape between said feeding means and said reel, a tape tension test lever in engagement with a surface of said tape between said punch mechanism and said reel normally retained in a first position by said predetermined tension on said tape and being operated into a second position responsive to a tension on said tape less than said predetermined tension, and means responsive to each operation of said punch mechanism for controlling the associated feeding means to advance the associated tape a predetermined distance; said tape perforator controller of said combination comprising a control relay provided with a first winding energized responsive to said test lever in said first tape perforator being in said first position and de-energized responsive to said test lever in said first tape perforator being in said second position and provided with a second winding energized responsive to the test lever in said second tape mechanism being in said first position and de-energized responsive to the test lever in said second tape perforator being in said second position, whereby said control relay is operated responsive to said first and second windings being energized and is restored responsive to either one of said first and second windings being de-energized, means responsive to the operated state of said control relay for rendering said tape perforator controller accessible to the toll ticket repeater, whereby the digits stored in the toll ticket repeater are transferred to and stored in the storage relays of said controller, means responsive to the storing of the digits in said storage relays for successively controlling said first and second tape perforator mechanisms and for successively operating and restoring the punch mechanism therein to perforate said first and second tapes at predetermined spaced intervals in accordance with said digits stored in said storage relays, and means responsive to the restored state of said control relay for rendering said tape perforator controller inaccessible to the toll ticket repeater.

14. In a toll ticketing telephone system including a toll ticket repeater having registered therein first digits indicative of first items of record information pertaining to a telephone connection and second digits indicative of second items of record information pertaining to a telephone connection; the combination of a first tape perforator and a second tape perforator and a tape perforator controller associated with the toll ticket repeater and controllable for producing on a corresponding first tape a record of said first digits and for producing on a corresponding second tape a record of said first and second digits stored in the toll ticket repeater and comprising storage relays in said controller operative for storing the digits registered in the toll ticket repeater, a control relay in said controller including a first winding energized responsive to said first tape perforator being operable for perforating said first tape and de-energized responsive to said first tape perforator being non-operable for perforating said first tape and provided with a second winding energized responsive to said second tape perforator being operable for perforating said second tape and de-energized responsive to said second tape perforator being non-operable for perforating said second tape, whereby said control relay is operated responsive to both of said first and second windings being energized and is restored responsive to either one of said first and second windings being de-energized, means responsive to the operated state of said control relay for rendering said tape perforator controller accessible to the toll ticket repeater, whereby the first and second digits stored in the toll ticket repeater are transferred to and stored in the storage relays of said controller, a group of selectively energizable magnets and a tape punch mechanism in each of said first and second tape perforators, said tape punch mechanism being selectively controlled in accordance with the energization of said corresponding magnets, and means responsive to the storing of said digits in said storage relays and controlled by said first digits therein for energizing the magnets in said first and second tape perforators in accordance with the individual first digits in order to selectively control said corresponding tape punch mechanism and for conjointly operating said controlled tape punch mechanisms in order to produce successive perforations on said first and second tapes corresponding to the individual stored first digits and controlled by the second digits stored in said storage relays for energizing the magnets in said second tape perforator in accordance with the individual second digits in order to selectively control said tape punch mechanism in said second tape perforator and for conjointly operating said controlled tape punch mechanism in order to produce perforations on said second tape corresponding to the individual stored second digits, whereby said first tape perforator is controlled to perforate the first tape in accordance with only certain of said items of information and said second tape perforator is controlled to perforate the second tape in accordance with all of said items of record information, and means responsive to the restored state of said control relay for rendering said tape perforator controller inaccessible to the toll ticket repeater.

15. In a toll ticketing telephone system including a toll ticket repeater having registered therein digits indicative of various items of record information pertaining to a telephone connection; the combination of a tape perforator and a tape perforator controller associated with the toll ticket repeater and controllable for producing on tape a record of the digits stored therein and comprising a tape supply reel on said perforator rotatably supporting a supply of unperforated tape, a punch mechanism, tape feeding means operative to feed a predetermined amount of said tape from said reel into perforating relation to said punch mechanism, a tape take-up reel, a motor for rotating said take-up reel to wind said tape thereon as it is perforated and fed from said tape feeding means, means controlled in the event said tape perforator is in condition to perforate said tape for rendering said tape perforator controller accessible to the toll ticket repeater, whereby the digits stored in the toll ticket repeater are transferred to and stored in the storage relays of said controller, means controlled incident to said transfer for operating said motor, a slip-clutch coupling said motor and said tape take-up reel permitting rotation of said take-up reel by said motor only to take up the slack in said tape between said tape-feeding means and said take-up reel and for preventing rotation of said take-up reel by said motor as soon as the slack in said tape is wound on said take-up reel, means in said controller for successively operating said punch mechanism to perforate said tape in accordance with a code indicative of the successive digits of the items of information stored in said tabulator storage relays, means controlled incident to each operation of said punch mechanism for operating said feeding means to feed said tape said predetermined amount, whereby said digits of said items of information are perforated at spaced intervals along said tape, and means for terminating operation of said motor after all of the items of record information stored in said storage relays have been perforated on said tape.

16. In a toll ticketing telephone system including a toll ticket repeater having registered therein digits indicative of various items of record information pertaining to a telephone connection; the combination of a tape perforator and a tape perforator controller associated with the toll ticket repeater and controllable for producing on tape a record of the digits stored therein and comprising a tape supply reel on said perforator rotatably supporting a supply of unperforated tape, a punch mechanism, tape feeding means operative to feed a predetermined amount of said tape from said reel into perforating relation to said punch mechanism, a tape take-up reel, a motor for rotating said take-up reel to wind said tape thereon as it is perforated and fed from said tape feeding means, means controlled in the event said tape perforator is in condition to perforate said tape for rendering said tape perforator controller accessible to the toll ticket repeater, whereby the digits stored in the toll ticket repeater are transferred to and stored in the storage relays of said controller, means controlled incident to said transfer for operating said motor, a slip-clutch coupling said motor and said take-up reel, said slip-clutch being adjusted to rotate said tape take-up reel under control of said motor to wind said tape thereon as said tape is fed from said tape feeding means and to slip whenever said tape restrains rotation of said take-up reel, means in said controller for successively operating said punch mechanism to perforate said tape in accordance with a code indicative of the successive digits of the items of information stored in said storage relays, means controlled incident to each operation of said punch mechanism for operating said feeding means to feed said tape said predetermined amount, whereby said digits of said items of information are perforated at spaced intervals along said tape, and means for terminating operation of said motor after all of the items of record information stored in said storage relays have been perforated on said tape.

References Cited in the file of this patent

UNITED STATES PATENTS

| | | |
|---|---|---|
| 2,297,365 | Ostline | Sept. 29, 1942 |
| 2,352,492 | Ostline | June 27, 1944 |
| 2,369,071 | Ostline | Feb. 6, 1945 |
| 2,447,533 | Retallack | Aug. 24, 1948 |
| 2,580,093 | Hersey | Dec. 25, 1951 |
| 2,581,287 | Ostline | Jan. 1, 1952 |
| 2,594,923 | Hersey et al. | Apr. 29, 1952 |
| 2,668,875 | Shepherd | Feb. 9, 1954 |
| 2,688,658 | Carpenter et al. | Sept. 2, 1954 |